United States Patent [19]

Takeuchi et al.

[11] Patent Number: 4,501,795
[45] Date of Patent: Feb. 26, 1985

[54] MAGNETIC RECORDING MEDIUM

[75] Inventors: Takashi Takeuchi; Syoji Kobayashi, both of Utsunomiya; Tsuyoshi Ootani, Ichikaimachi; Tetsuya Imamura, Utsunomiya, all of Japan

[73] Assignee: Kao Corporation, Tokyo, Japan

[21] Appl. No.: 581,764

[22] Filed: Feb. 21, 1984

[30] Foreign Application Priority Data

Mar. 31, 1983 [JP] Japan ................. 58-56325

[51] Int. Cl.$^3$ .............................................. H01F 10/02
[52] U.S. Cl. ..................................... 428/329; 427/127; 427/130; 427/132; 428/328; 428/339; 428/407; 428/425.9; 428/457; 428/480; 428/694; 428/900
[58] Field of Search ................................. 427/127–132, 427/48; 428/425.9, 457, 900, 328, 694, 339, 695, 407, 480

Primary Examiner—Bernard D. Pianalto
Attorney, Agent, or Firm—Flynn, Thiel, Boutell & Tanis

[57] ABSTRACT

Magnetic recording particles (i) are coated with a reaction product of (ii) an isocyanate compound such as polyisocyanate compounds and isocyanate compounds having a hydrolyzable alkoxysilane group, and (iii) a phosphoric ester of an alkanol, alkenol, alkylene oxide additives thereof or aliphatic carboxylic alkylene oxides.

9 Claims, No Drawings

MAGNETIC RECORDING MEDIUM

This invention relates to a magnetic recording medium. More particularly, it relates to a magnetic recording medium with excellent magnetic properties and durability produced by using a magnetic paint improved in dispersibility of magnetic powders and in adhesion between magnetic powder and binder.

The magnetic powder used in a magnetic recording medium such as magnetic tape or magnetic disc are required to have high dispersibility.

Generally, a magnetic recording medium is produced by uniformly coating a substrate such as a plastic film or sheet with a magnetic paint prepared from a mixture of magnetic powder, binder, various types of additives and solvent, and after drying, specular surface finish treating the magnetic layer. The magnetic powder in the magnetic paint must be sufficiently dispersed and peptized to remove agglomerated particles. This is essential for forming a uniform and smooth magnetic layer with a high packing density.

Non-uniformity of the magnetic layer due to agglomerated magnetic powder exerts a serious adverse effect on the electromagnetic transduction characteristics and magnetic properties of magnetic tape. That is, such non-uniformity invites an output reduction, increase of noise, drop out and other troubles. Also, poor adhesion between the magnetic powder and the binder tends to cause peeling the magnetic powder from the magnetic layer when the magnetic recording medium slides on the recording head or reproducing head. As a consequence, the coat surface of the magnetic recording medium is roughened to impair its durability. The conventional magnetic recording media have been placed on the market with this durability problem unsolved.

As discussed above, the dispersibility of the magnetic powder in the magnetic paint and the adhesion between the magnetic powder and the binder are very important factors for improving the performance of the magnetic recording medium.

Many studies have been made from various aspects on the improvement of the dispersibility of the magnetic powder. For instance, addition of a proper surfactant to a magnetic paint formulation has been proposed. As such a surfactant, an amine and its derivative, phosphoric ester, polyoxyethylene phosphate or the like is used in most cases. They include, for example, an alkylimidazoline compound (Japanese Patent Laid-Open No. 32304/1979), alkylpolyoxyethylene phosphate neutralized with alkylamine (Japanese Patent Laid-Open No. 78810/1978), and long-chain alkyl phosphate (Japanese Patent Laid-Open No. 147507/1979 and Japanese Patent Application No. 49629/1978). It has been also disclosed that the dispersibility is improved by preparing a magnetic paint after treating the surface of magnetic powder, and for this purpose, there have been proposed use of alkylpolyoxyethylene phosphates (Japanese Patent Laid-Open Nos. 94308/1979 and 49769/1981). In addition, a metallic powder has been treated with a titanium coupling agent to attain dispersion stability and to prevent the deterioration of the magnetic layer (Japanese Patent Laid-Open No. 88471/1981). As means for improving the magnetic powder and binder adhesion to increase the durability of the magnetic layer, the following methods have been proposed: a silane coupling agent having a functional group reactable with the binder is used (Japanese Patent Laid-Open No. 7310/1979); the magnetic powder is coated with a reaction product of an amino-functional silane coupling agent and an isocyanate or epoxy compound (Japanese Patent Laid-Open No. 143533/1981); the magnetic powder is treated with a titanium coupling agent having unsaturated bonds radical-polymerizable with double bonds in the binder (Japanese Patent Laid-Open No. 111129/1981); and a compound having at least four radiation-sensitive acrylic double bonds in the molecule is used as a binder (Japanese Patent Laid-Open No. 40744/1982). Thus, many studies and proposals have been made on the improvement of the dispersibility of the magnetic powder in the magnetic paint and the durability of the magnetic layer. Nevertheless, none of these proposals has reached the stage of satisfactory improvement.

In view of these problems of the conventional magnetic recording media, the inventors of this invention have strenuously pursued their studies for obtaining a magnetic recording medium excellent in dispersibility of the magnetic powder and durability of the magnetic layer and, as a result, found that a magnetic recording medium comprising magnetic powder coated with a reaction product of a specific compound or compounds having isocyanate groups and at least one compound selected from the group of specified phosphoric esters shows good dispersion of the magnetic powder and is also excellent in durability of the magnetic layer and in electromagnetic transduction characteristics as well. The present invention was attained on the basis of this finding.

Thus, the present invention provides a magnetic recording medium comprising magnetic powder coated with a reaction product of at least one isocyanate compound selected from the groups consisting of:

(I) polyisocyanate compounds having at least two isocyanate groups in one molecule and having a molecular weight of 100 to 1,000, and (II) isocyanate compounds having a hydrolyzable alkoxysilane group and at least one isocyanate group in one molecule and having a molecular weight of 140 to 1,500;

and at least one phosphoric ester selected from the group consisting of:

(III) phosphoric esters represented by the general formula:

$$(RO)_l PO(OH)_{3-l} \qquad (a)$$

wherein R is an alkyl or alkenyl group having 3 to 22 carbon atoms, and l is a number of 1, 1.5 or 2, (IV) phosphoric esters represented by the general formula:

$$[RO(AO)_n]_l PO(OH)_{3-l} \qquad (b)$$

wherein R is an alkyl or alkenyl group having 3 to 22 carbon atoms, A is an alkylene group having 2 to 4 carbon atoms, l is a number of 1, 1.5 or 2, and n is an integer of 1 to 30, and (V) phosphoric esters represented by the general formula:

$$[R'COO(AO)_n]_l PO(OH)_{3-l} \qquad (c)$$

wherein R' is an alkyl or alkenyl group having 2 to 21 carbon atoms, A is an alkylene group having 2 to 4 carbon atoms, l is a number of 1, 1.5 or 2, and n is an integer of 1 to 30.

The isocyanate compounds specified in (I) and (II) above in accordance with this invention include, for instance, toluene diisocyanate, methylenebisphenylene diisocyanate, hexamethylene diisocyanate, a reaction product of one mol of trimethylolpropane and 3 mol of toluene diisocyanate, and compounds represented by the following chemical formulae:

OCN—(CH$_2$)$_6$—NHCONH(CH$_2$)$_3$Si(OC$_2$H$_5$)$_3$,

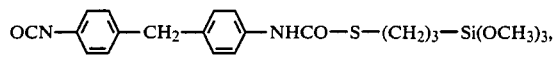
OCN—⟨⟩—CH$_2$—⟨⟩—NHCO—S—(CH$_2$)$_3$—Si(OCH$_3$)$_3$,

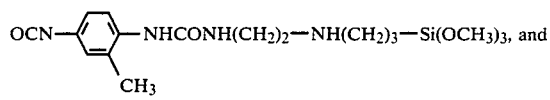
OCN—⟨⟩—NHCONH(CH$_2$)$_2$—NH(CH$_2$)$_3$—Si(OCH$_3$)$_3$, and
     |
     CH$_3$

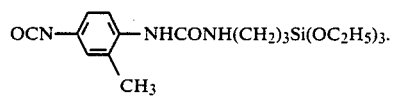
OCN—⟨⟩—NHCONH(CH$_2$)$_3$Si(OC$_2$H$_5$)$_3$.
     |
     CH$_3$

The compounds represented by the above formula (a) are mono-, di- or sesqui-phosphates, derived from phosphoric acid and alkanols or alkenols having 3 to 22 carbon atoms. More specifically, they include monododecyl phosphate, didodecyl phosphate, sesquidodecyl phosphate, sesquipropyl phosphate, sesquioctyl phosphate, sesquioleyl phosphate, monohexyl phosphate, dihexyl phosphate, monooleyl phosphate and the like.

The compounds represented by the above formula (b) are mono-, di- or sesqui-phosphates, derived from phosphoric acid and lower alkylene oxide adducts of alkanols or alkenols having 3 to 22 carbon atoms. More particularly, they include, for example, sesquidodecylpolyoxyethylene(3) phosphate, sesquidodecylpolyoxyethylene(9) phosphate, monododecylpolyoxyethylene(5) phosphate, monooctadecylpolyoxyethylene(5) phosphate, sesquioctadecylpolyoxyethylene(15) phosphate, dioctylpolyoxyethylene(6) phosphate, sesquidodecylpolyoxypropylene(9) phosphate, monooctylpolyoxyethylene(12) phosphate, and monooctadecenylpolyoxyethylene(8) phosphate.

The compounds represented by the above formula (c) are mono-, di- or sesqui-phosphates derived from phosphoric acid and lower alkylene oxide adducts of fatty acids having 3 to 22 carbon atoms, and typical examples of these compounds include those represented by the following chemical formulae:

[C$_{11}$H$_{25}$COO(CH$_2$CH$_2$O)$_{10}$]$_{1.5}$PO(OH)$_{1.5}$,

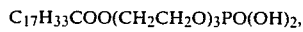
C$_{17}$H$_{33}$COO(CH$_2$CH$_2$O)$_3$PO(OH)$_2$,

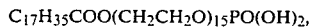
C$_{17}$H$_{35}$COO(CH$_2$CH$_2$O)$_{15}$PO(OH)$_2$, and

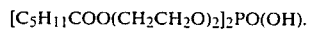
[C$_5$H$_{11}$COO(CH$_2$CH$_2$O)$_2$]$_2$PO(OH).

The magnetic powder used in this invention is available from various sources such as fine acicular metal oxides including γ-Fe$_2$O$_3$, Fe$_3$O$_4$ and CrO; processed γ-Fe$_2$O$_3$ such as Co-coated γ-Fe$_2$O$_3$ and Co-doped γ-Fe$_2$O$_3$; metallic iron powder, fine lamellar barium ferrite or magnetic powder thereof in which part of the iron atoms have been substituted with one or more of atoms such as Ti, Co, Zn, V or Nb; and microfine powder of specified metals or alloys such as Fe, Co, Fe-Co, or Fe-Ni. Among these materials, metallic iron powder is poor in chemical stability and therefore it may be used after addition of a small quantity of nickel, cobalt, titanium, silicon, aluminum or the like in the form of metallic atom, salt or oxide, or surface treatment to improve the chemical stability. Also, it is often attempted to form a thin oxide film on the surface of the metallic iron powder in a weakly oxidizing atmosphere for covering its poor chemical stability, and the metallic powder thus treated can be used in this invention.

The particle size of the magnetic powder used in this invention is preferably within the range of 1 to 0.15μ in diameter on the long axis and 0.15 to 0.015μ in diameter on the short axis. If the diameter on the long axis is greater than 1μ, there are brought about certain disadvantages such as impaired short wave length recording and increased noise, although dispersion is facilitated. On the other hand, if the diameter on the long axis of the powder particle is smaller than 0.015μ, the produced magnetic recording medium proves unsatisfactory in the dispersion of the powder.

In the present invention, the method for obtaining magnetic powder coated with a reaction product of an isocyanate compound or compounds selected from those defined in (I) and (II) above and a phosphoric ester or esters selected from those defined in (III) to (V) above is not specified; such magnetic powders can be formed by any suitable method such as those exemplified below:

(A) Magnetic powders (i) are treated together with an isocyanate compound or compounds (ii) selected from (I) and (II) by heating in an inert organic solvent and then with a phosphate ester or esters (iii) selected from (III) to (V).

(B) Said materials (i), (ii) and (iii) are mixed at once and heated in an inert organic solvent.

(C) Said materials (ii) and (iii) are heated in an inert organic solvent and the reaction product is mixed with (i) and heated.

The magnetic recording medium according to this invention is produced by adding a binder and a solvent and, if necessary, a hardening agent to a magnetic powder obtained in the manner described above to form a magnetic paint and applying the obtained magnetic paint to a substrate such as polyester film. The particulars of the method of production will be further described along with the method of treating the magnetic powder in the Examples given later.

The amount of the isocyanate compound(s) selected from (I) and (II) to be used in this invention is about 0.1 to 7% by weight, preferably 0.5 to 3% by weight, based on that of the magnetic powders. The phosphoric ester(s) selected from the compounds of (III) to (V) should be used in such an amount that there will be left no unreacted portion stoichimetrically and that at least one of the isocyanate groups in said polyisocyanate compound will be left intact. It is desirable, of course, to set the reaction conditions such as reaction temperature and reaction time such that the maximum reaction rate will be provided.

The inert solvents usable in the treatment of the magnetic powder according to this invention are, for example, methyl ethyl ketone, methyl isobutyl ketone, diethyl ketone, cyclohexanone, benzene, xylene and toluene.

The binder used in processing the treated magnetic powders into a magnetic paint is a resin binder soluble in the organic solvent used in the process. There can be used any type of resin binder which is capable of binding the magnetic powders to the substrate while also binding the magnetic powder particles to each other at a necessary strength by using as small an amount as possible. Those binders which may lower the dispersibility of magnetic powders in a paint may also be used by a usual paint formulation method. Examples of these resin binders include polyurethane, polyester, polyvinyl chloride, vinyl chloride/vinyl acetate co-polymer, polyacrylonitrile, nitrile rubber, epoxy resin, alkyd resin, polyamide, polyacrylic esters, polymethacrylic esters, polyvinyl acetate, polyvinyl butyral, polyvinylidene chloride, vinylidene chloride copolymer, pyroxylin, and ethylcellulose. These binders are generally used in admixture of two or more of them though they may be used alone. A suitable plasticizer and/or a hardener may be added for adjusting the resin hardness.

The amount of the binder added is usually 15 to 60 parts by weight per 100 parts by weight of magnetic powder. Even in the case of using a binder having the greatest bonding force, if the amount is less than 15 parts by weight, the magnetic paint film strength is low and the bonding strength between a substrate and the magnetic paint film becomes insufficient. On the other hand, if the amount of the binder is greater than 60 parts by weight, the magnetic powder concentration in the magnetic paint film becomes low, causing a decrease in the reproduction output and lowering the magnetic paint film properties.

The solvent used in paint formulation is preferably one which can dissolve a binder and has a boiling point between 50° and 150° C. If the boiling point of the solvent used is too low, the painted film layer is dried before the magnetic orientation is performed and the intended treatment cannot be accomplished satisfactorily. Thus, the solvent is selected from the above viewpoint in accordance with the kind of the binder. It should be, of course, selected in consideration of toxicity or environmental pollution.

The present invention will now be described in more detail by way of the embodiments thereof, but it is to be understood that the scope of this invention is not limited by these embodiments.

EXAMPLE 1

150 g of Co-coated $\gamma$-Fe$_2$O$_3$ with a long axis of 0.35 $\mu$m and an axis ratio of 1/10, 400 g of methyl ethyl ketone and 3 g of

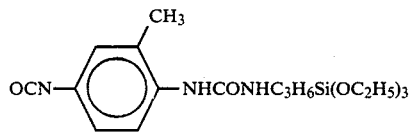

were fed into a four-necked flask equipped with a condenser and stirred at 90° C. for one hour, and then the magnetic powder was washed with a large amount of methyl ethyl ketone. Then 120 g of the magnetic powder and 6 g of sesquidodecylpolyoxyethylene(3) phosphate were placed in a four-necked flask and stirred at 80° to 90° C. for one hour to obtain a treated magnetic powder. The obtained powder was washed with a large amount of methyl ethyl ketone. The treated magnetic powder was mixed with 25% by weight (based on the magnetic powder) of a 1:1 (by weight) mixture of a vinyl chloride/vinyl acetate copolymer (VAGH, a product of Union Carbide Corp.) and a polyurethane resin (Nippolan 2304, a product of Nippon Polyurethane Kogyo KK) as binder and 130 g of a 1:1 (by weight) mixture of methyl ethyl ketone and cyclohexanone as solvent, and the mixture was milled by a ball mill for 24 hours. The mixture was then mixed with 10 g of a hardener (Coronate, a product of Nippon Polyurethane Kogyo KK) and stirred until the mixture became homogeneous to obtain a magnetic paint.

This magnetic paint was then applied to a surface of a polyester film with a 30 $\mu$m applicator, after magnetic orientation and hot air drying, and then the paint film was smoothed by calendering to obtain a magnetic recording medium. The obtained magnetic recording medium was measured for a squareness ratio which is a measure for evaluating the dispersibility of the magnetic powder and further measured for an abrasion loss for evaluating the durability of the magnetic recording medium. The results are shown in Table 1. The measurement of the abrasion loss was carried out by rubbing a 3 by 50 cm piece of the magnetic recording medium with an Emery paper CC-1000, under a constant load for 60 minutes.

In order to examine the electromagnetic transduction characteristics, the magnetic recording medium was cut to a width of 6.25 mm and set on a commercially available open reel deck, and the reproducing output at 3 kHz was measured. The results are shown in Table 1. The value shown in the table is relative to the reproduction output, given as 0, of the magnetic recording medium prepared in Comparative Example 1.

EXAMPLE 2

A treated magnetic powder, a magnetic paint and a magnetic recording medium were produced in the same way as in Example 1 except that 3 g of octylpolyoxypropylene(9) phosphate was used in place of sesquidodecylpolyoxyethylene(3) phosphate, and the obtained magnetic recording medium was subjected to the determination of squareness ratio, abrasion loss and reproducing output according to the methods used in Example 1. The results are shown in Table 1.

EXAMPLE 3

A treated magnetic powder, a magnetic paint and a magnetic recording medium were produced in the same way as in Example 1 except that 4 g of

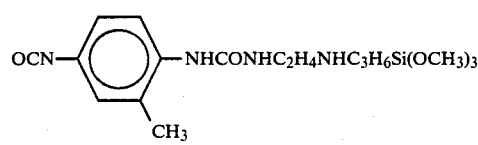

was used in place of the isocyanate compound of Example 1 and 6 g of monooleyl phosphate was used in place of sesquidodecylpolyoxyethylene(3) phosphate. The obtained magnetic recording medium was subjected to the determination of squareness ratio, abrasion loss and reproducing output according to the methods of Example 1. The results are shown in Table 1.

EXAMPLE 4

A treated magnetic powder, a magnetic paint and a magnetic recording medium were produced in the same way as in Example 1 except that 6 g of sesquihexyl phosphate was used in place of monooleyl phosphate, and the squareness ratio, abrasion loss and reproducing output were measured with the obtained magnetic recording medium according to the methods used in Example 1. The results are shown in Table 1.

EXAMPLE 5

A treated magnetic powder, a magnetic paint and a magnetic recording medium were produced in the same way as in Example 1 except that 10 g of sesquidodecylpolyoxyethylene(5) phosphate was used in place of sesquidodecylpolyoxyethylene(3) phosphate. The squareness ratio, abrasion loss and reproducing output were measured with the obtained magnetic recording medium according to the manner of Example 1. The results are shown in Table 1.

EXAMPLE 6

In the same way as in Example 3 except for the use of 4.5 g of methylenebisphenylene diisocyanate instead of the isocyanate compound of Example 3, a treated magnetic powder, a magnetic paint and a magnetic recording medium were produced. The squareness ratio, abrasion loss and reproducing output were measured with the magnetic recording medium according to the manner of Example 1. The results are shown in Table 1.

EXAMPLE 7

By following the same process as in Example 1 except that the amount of the isocyanate compound used in Example 1 was reduced to 2 g and that 6 g of $[C_{11}H_{25}COO(CH_2CH_2O)_{10}]_{1.5}PO(OH)_{1.5}$ was used in place of sesquidodecylpolyoxyethylene(3) phosphate, a treated magnetic powder, a magnetic paint and a magnetic recording medium were produced and the squareness ratio, abrasion loss and reproducing output were measured with the magnetic recording medium according to the methods used in Example 1. The results are shown in Table 1.

COMPARATIVE EXAMPLE 1

A magnetic powder was produced by merely adding 4.5 g of soybean lecithin as dispersant to 150 g of Co-coated $\gamma$-$Fe_2O_3$ having a particle diameter along the major axis of 0.35 $\mu$m and an axial ratio of 1/10, the same one as used in Example 1, and this magnetic powder, without being subjected to any surface treatment, was processed in the otherwise same way as in Example 1 to produce a magnetic coating material and a magnetic recording medium. The obtained magnetic recording medium was subjected to the measurement of the squareness ratio, abrasion loss and reproducing output according to the methods used in Example 1. The results are shown in Table 1.

COMPARATIVE EXAMPLE 2

A magnetic paint and a magnetic recording medium were produced in the same way as in Comparative Example 1 except that 4.5 g of octyl phosphate was used in place of soybean lecithin, and the squareness ratio, abrasion loss and reproducing output were measured with the magnetic recording medium according to the manner of Example 1. The results are shown in Table 1.

TABLE 1

| Magnetic recording medium | Squareness ratio | Abrasion loss (mg) | Reproducing output (dB) |
| --- | --- | --- | --- |
| Example 1 | 0.85 | 8 | 2.7 |
| Example 2 | 0.84 | 5 | 1.7 |
| Example 3 | 0.85 | 5 | 2.1 |
| Example 4 | 0.86 | 7 | 2.5 |
| Example 5 | 0.84 | 3 | 1.7 |
| Example 6 | 0.83 | 9 | 1.5 |
| Example 7 | 0.85 | 10 | 2.0 |
| Comparative Example 1 | 0.83 | 87 | 0 |
| Comparative Example 2 | 0.84 | 112 | 0.4 |

The embodiments of the invention in which an exclusive property or privilege is claimed are defined as follows:

1. A magnetic recording medium comprising a magnetic film coated on a substrate, said magnetic film comprising magnetic particles dispersed in an effective amount of a binder for adhering said magnetic particles to said substrate, said magnetic particles consisting essentially of particles of a magnetic powder (i) coated with a reaction product of (ii) at least one isocyanate compound selected from the group consisting of:

(I) polyisocyanate compounds having at least two isocyanate groups in one molecule and having a molecular weight of 100 to 1,000, and (II) isocyanate compounds having a hydrolyzable alkoxysilane group and at least one isocyanate group in one molecule and having a molecular weight of 140 to 1,500, and (iii) at least one phosphoric ester selected from the group consisting of:

(III) phosphoric esters of the formula:

$$(RO)_l PO(OH)_{3-l} \qquad (a)$$

wherein R is an alkyl or alkenyl group having 3 to 22 carbon atoms, and l is 1, 1.5 or 2, (IV) phosphoric esters of the formula:

$$[RO(AO)_n]_l PO(OH)_{3-l} \qquad (b)$$

wherein R and l have the same meanings as defined above, A is an alkylene group having 2 to 4 carbon atoms, and n is an integer of from 1 to 30, and (V) phosphoric esters of the formula:

$$[R'COO(AO)_n]_l PO(OH)_{3-l} \qquad (c)$$

wherein R' is an alkyl or alkenyl group having 2 to 21 carbon atoms, and A, l and n have the same meanings as defined above.

2. A magnetic recording medium as claimed in claim 1, in which said isocyanate compound (i) is used in an amount of 0.1 to 7 percent by weight, based on the weight of said magnetic powder, and said phosphoric ester (iii) is used in an amount such that all of said phosphoric ester (iii) reacts stoichiometrically with said isocyanate compound and at least one isocyanate group of the isocyanate compound (ii) remains unreacted.

3. A magnetic recording medium as claimed in claim 2, wherein the amount of said isocyanate compound (i)

is in the range of 0.5 to 3 percent by weight based on the weight of said magnetic powder.

4. A recording medium as claimed in claim 2, wherein said isocyanate compound is selected from the group consisting of toluene diisocyanate, methylenebisphenylene diisocyanate, hexamethylene diisocyanate, a reaction product of one mol of trimethylolpropane and 3 mol of toluene diisocyanate, $OCN-(CH_2)_6-NHCONH(CH_2)_3Si(OC_2H_5)_3$,

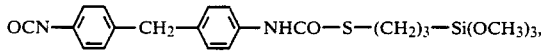

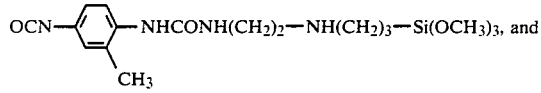

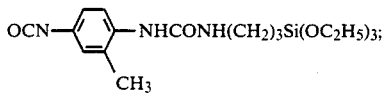

and said phosphoric ester is selected from the group consisting of monododecyl phosphate, didodecyl phosphate, sesquidodecyl phosphate, sesquipropyl phosphate, sesquioctyl phosphate, sesquioleyl phosphate, monohexyl phosphate, dihexyl phosphate, monooleyl phosphate, sesquidodecylpolyoxyethylene(3) phosphate, sesquidodecylpolyoxyethylene(9) phosphate, monododecylpolyoxyethylene(5) phosphate, monooctadecylpolyoxyethylene(5) phosphate, sesquioctadecylpolyoxyethylene(15) phosphate, dioctylpolyoxyethylene(6) phosphate, sesquidodecylpolyoxypropylene(9) phosphate, monooctylpolyoxyethylene(12) phosphate, monooctadecenylpolyoxyethylene(8) phosphate, $[C_{11}H_{25}COO(CH_2CH_2O)_{10}]_{1.5}PO(OH)_{1.5}$, $C_{17}H_{33}COO(CH_2CH_2O)_3PO(OH)_2$, $C_{17}H_{35}COO(CH_2CH_2O)_{15}PO(OH)_2$, and $[C_5H_{11}COO(CH_2CH_2O)_2]_2PO(OH)$.

5. A magnetic recording medium as claimed in claim 1, wherein said recording medium is formed by a process comprising mixing said magnetic powder, said binder and an inert solvent for said binder to form a magnetic paint, coating said magnetic paint onto said substrate to form said magnetic film on said substrate, and drying said magnetic film to remove the solvent.

6. A magnetic recording medium as claimed in claim 1, wherein the amount of said binder is in the range of 15 to 60 parts by weight per 100 parts by weight of said magnetic powder.

7. A magnetic recording medium as claimed in claim 6, wherein said substrate is a polyester film.

8. A magnetic recording medium as claimed in claim 1, wherein said magnetic powder has particle sizes in the range of from 0.15 to $1\mu$ on the long axis thereof and from 0.015 to $0.15\mu$ on the short axis thereof.

9. A recording medium as claimed in claim 8, wherein said particles of magnetic powder are selected from the group consisting of particles of $\gamma\text{-}Fe_2O_3$, $Fe_3O_4$, CrO, Co-coated $\gamma\text{-}Fe_2O_3$, Co-doped $\gamma\text{-}Fe_2O_3$, microfine powders of Fe, Co, Fe-Co, and Fe-Ni, and fine lamellar barium ferrite and magnetic powders thereof in which part of the iron atoms have been replaced with one or more of Ti, Co, Zn, V or Nb.

* * * * *